(12) United States Patent
Friedmann

(10) Patent No.: US 6,443,864 B1
(45) Date of Patent: Sep. 3, 2002

(54) MECHANISM FOR TRANSMITTING TORQUE BETWEEN COAXIAL PARTS OF TRANSMISSIONS AND THE LIKE

(75) Inventor: Oswald Friedmann, Lichtenau-Ulm (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/708,842

(22) Filed: Nov. 8, 2000

(30) Foreign Application Priority Data

Nov. 8, 1999 (DE) .......................... 199 53 580

(51) Int. Cl.[7] .................... F16H 63/00; F16D 3/06
(52) U.S. Cl. .................... 474/18; 474/70; 464/162
(58) Field of Search .................... 474/8, 17, 18, 474/70; 464/99, 162

(56) References Cited

U.S. PATENT DOCUMENTS

| | | | | |
|---|---|---|---|---|
| 1,455,242 A | * | 5/1923 | Corgiat, Jr. et al. | 464/99 |
| 3,759,063 A | * | 9/1973 | Bendall | 464/99 |
| 4,385,895 A | * | 5/1983 | Wirth | 464/69 |
| 4,601,679 A | * | 7/1986 | Bock | 474/11 |
| 4,927,404 A | | 5/1990 | Rattunde | |
| 5,295,915 A | | 3/1994 | Friedmann | |
| 5,427,583 A | | 6/1995 | Wolf | |
| 5,711,730 A | | 1/1998 | Friedman et al. | |
| 5,725,447 A | | 3/1998 | Friedmann et al. | |
| 5,755,622 A | * | 5/1998 | Kanki et al. | 464/99 |

FOREIGN PATENT DOCUMENTS

EP 0 082 797 * 6/1983 ............. F16D/3/72

* cited by examiner

Primary Examiner—David A. Bucci
Assistant Examiner—Timothy McAnulty
(74) Attorney, Agent, or Firm—Darby & Darby

(57) ABSTRACT

A torque transmitting mechanism between coaxial first and second rotary parts, at least one of which should be free to move axially relative to the other part, employs two frames at least one of which is resilient. Both frames surround one of the parts (e.g., a shaft for one adjustable pulley of a continuously variable transmission), one of the frames has spaced-apart sections affixed to the first part, and the other frame has spaced-apart sections affixed to the second part (e.g., to one flange of the adjustable pulley). Rivets and/or other suitable fasteners couple the two frames to each other at locations each of which is spaced apart from a section of one of the frames and from a section of the other frame. Each frame can have a polygonal outline with corners which are alternatingly coupled to the other frame and to the respective rotary part. The braces between the corners of each polygonal frame can be profiled to oppose certain types of deformation but to permit other types of deformation.

28 Claims, 3 Drawing Sheets

MECHANISM FOR TRANSMITTING TORQUE BETWEEN COAXIAL PARTS OF TRANSMISSIONS AND THE LIKE

BACKGROUND OF THE INVENTION

The invention relates to improvements in mechanisms or systems for transmission of torque between coaxial rotary parts. More particularly, the invention relates to improvements in mechanisms which can be utilized for the transmission of torque between coaxial rotary parts at least one of which is movable or should be free to move axially relative to the other part. Examples of structures in which the torque transmitting mechanism of the present invention can be put to use are so-called continuously variable transmissions (CVT) wherein one of two adjustable pulleys or sheaves can transmit torque to the other pulley or sheave by way of an endless chain or belt. At least one of the pulleys has an axially fixed first flange which is secured to a driving or driven shaft and a second flange which is movable axially of the shaft toward and away from but should share the angular movements of the first flange.

Continuously variable transmissions are becoming increasingly popular for the transmission of torque in the power trains of motor vehicles, e.g., between a manually or automatically operable clutch and a differential for the front or rear wheels of the vehicle. As a rule, a continuously variable transmission (hereinafter called CVT for short) employs a first shaft which is driven by the prime mover (such as an internal combustion engine) in the power train of a motor vehicle and carries a first adjustable pulley, a second shaft which drives the differential and also carries an adjustable pulley, and an endless belt or chain which is trained over the pulleys. Each pulley has a first flange which is affixed to the respective shaft, and a second flange which is movable axially of the respective shaft toward and away from the associated axially fixed flange. The ratio of the CVT is changed by causing or permitting the axially movable flange of one pulley to move axially of the respective shaft toward the other flange of the one pulley simultaneously with a movement of the movable flange of the other pulley away from the axially fixed flange, or vice versa.

Several embodiments of continuously variable transmissions of the just outlined character are disclosed, for example, in commonly owned U.S. Pat. Nos. 5,295,915 (granted Mar. 22, 1994 to Friedmann for "CONTINUOUSLY VARIABLE SPEED TRANSMISSION"), 5,711,730 (granted Jan. 27, 1998 to Friedmann et al. for "TORQUE MONITORING APPARATUS") and 5,725,447 (granted Mar. 10, 1998 to Friedmann et al. for "POWER TRAIN WITH INFINITELY VARIABLE RATIO TRANSMISSION").

In a so-called wet-running CVT, the torque transmitting connection between each shaft and the axially movable flange of the respective pulley comprises rotation preventing means of the type employing teeth, splines and/or spheres. On the other hand, a dry-running CVT often employs one or more leaf springs which can yield to permit axial movements of one flange relative to the other flange but are intended to compel both flanges to rotate in the same direction. However, the angular position of the movable flange relative to the angular position of the other flange (i.e., of the flange which is held against axial movement relative to its shaft) varies while the leaf spring or springs permits or permit the axially movable flange to move axially toward or away from the other flange. Such angular displacement entails additional stressing of the endless flexible element, e.g., a chain of the type disclosed in U.S. Pat. No. 4,927,404 granted May 22, 1990 to Rattunde for "LINK CHAIN FOR AN INFINITELY VARIABLE CONE DRIVE DISK TRANSMISSION" or in U.S. Pat. No. 5,427,583 granted Jun. 27, 1995 to Wolf for "LOW-NOISE, TRIPLE SIDE BAR SPROCKET CHAIN FOR INFINITELY VARIABLE TRANSMISSION".

The disclosure of the commonly owned copending German priority patent application Serial No. 199 53 580.9 (filed Nov. 8, 1999) and the disclosures of all US and foreign patents and patent applications identified in the specification of the present application are incorporated herein by reference.

OBJECTS OF THE INVENTION

An object of the present invention is to provide a novel and improved torque transmitting mechanism or system which prevents the axially movable part of an adjustable pulley or the like from turning relative to the axially fixed part during axial movement toward and away from the axially fixed part without the need for the establishment of a direct rotation-preventing connection between the two parts.

Another object of the invention is to provide a torque transmitting mechanism which employs leaf springs or analogous components but in such a way that these components cannot compel the axially movable part to turn (even slightly) relative to the axially fixed part during movement of the axially movable part toward or away from the axially fixed part.

A further object of the invention is to provide a torque transmitting mechanism which is compact, simple and inexpensive but highly reliable for long periods of use, e.g., in the power trains of motor vehicles.

An additional object of the invention is to provide a continuously variable transmission which employs one or more torque transmitting mechanisms or systems of the above outlined character.

Still another object of the invention is to provide a novel and improved torque transmitting connection between a rotary shaft and a part (such as a conical flange of a pulley on the shaft) which should be free or compelled to rotate with the shaft but should be prevented from carrying out any, even slight, angular movements relative to the shaft.

A further object of the invention is to provide a novel and improved method of transmitting torque between coaxial parts one of which must be free to move axially of but must be compelled to invariably rotate with the other part.

Another object of the invention is to provide a novel and improved torque transmitting mechanism or system which employs leaf springs.

An additional object of the invention is to simplify but to simultaneously enhance the reliability of a torque transmitting connection between a driving or driven shaft and an axially movable part which shares all angular movements of the shaft.

Still another object of the invention is to provide a torque transmitting mechanism which can be employed in numerous existing types of dry-running continuously variable transmissions.

A further object of the invention is to provide novel and improved springs for use in mechanisms which serve to transmit torque between a first rotary part and a second rotary part that should be free to move axially of but should not turn relative to the first rotary part.

An additional object of the invention is to prevent excessive stressing of chains which are utilized to transmit torque between the pulleys of a continuously variable transmission.

SUMMARY OF THE INVENTION

One feature of the present invention resides in the provision of a mechanism which is designed to transmit torque between first and second members. These members are rotatable about a common axis and at least one thereof is movable relative to the other member in the direction of the common axis. The improved torque transmitting mechanism comprises first and second frames (such as polygonal, oval or circular frames) which spacedly surround the common axis when the mechanism is in use and at least one of which is deformable. The mechanism further comprises a plurality of means (e.g., rivets, threaded fasteners, snap-on fasteners or the like) which serve to secure at least two spaced-apart sections of the first frame for rotation with the first member, a plurality of means (e.g., rivets, threaded fasteners or any other suitable fasteners) for mounting at least two spaced-apart sections of the second frame for rotation with the second member, and a plurality of means (e.g., rivets and/or other suitable fasteners) for non-rotatably coupling the frames to each other at a plurality of locations each of which is disposed between one section of the first frame and one section of the second frame.

The securing means can alternate with the coupling means as seen circumferentially of the common axis when the frame surrounds the common axis, i.e., when the improved mechanism is installed between the two coaxial parts. Each of the aforementioned plurality of locations can alternate with one of the securing means and with one of the mounting means, again as seen in the circumferential direction of the common axis. One of the coaxial members can include a shaft, and the other of the members can constitute a part (such as a conical flange) of a pulley in a continuously variable transmission.

Each securing means can be aligned with one of the mounting means, and the securing means are or can be equdistant from each other as seen circumferentially of the common axis when the frames are mounted in a transmission or the like so that they spacedly surround the common axis of the first and second members. Each coupling means is or can be equidistant from two of the securing means and/or from two of the mounting means.

Each securing means can be spaced apart from the common axis a first radial distance, and each of the mounting means is or can be spaced apart from the common axis a second distance which matches or at least approximates the first distance when the frames are properly mounted in a transmission or the like.

Each frame can include a plurality of braces each of which extends between one of the securing and mounting means on the one hand, and one of the coupling means on the other hand. Each such brace can exhibit a pronounced resistance to tensional stresses and a lesser resistance to certain other stresses, e.g., bending stresses (including torsional stresses).

The improved mechanism can be constructed and assembled in such a way that its first and second frames respectively comprise pluralities of first and second braces. Each first brace can extend between one of the securing means and one of the coupling means, and each second brace can extend between one of the mounting means and one of the coupling means.

At least one of the frames can be made, at least in part, of a suitable metallic sheet material. Such material can be selected with a view to ensure that the respective frame is resilient. The at least one frame can include elongated braces having profiles arranged in a manner to promote resistance of the profiles to compressive stresses. The preferably resilient at least one frame can include weakened portions in the regions of at least some of the securing and/or mounting means.

The coupling means of the improved mechanism are constructed and mounted in such a way that they can move radially or substantially radially of the common axis of the first and second members when the at least one member is caused or permitted to move axially relative to the other member. The coupling means of such mechanism are fixed in the circumferential direction of the first and second members when the mechanism is in use, i.e., when the frames surround the common axis of the two members.

The securing, mounting and/or coupling means can include connections comprising or constituting riveted, threaded, snap-on or snap-in and/or other suitable fasteners which are capable of reliably coupling the frames to each other, of reliably securing the first frame to the first member, and of reliably mounting the second frame on the second member.

Another feature of the present invention resides in the provision of a torque transmitting apparatus which comprises a shaft rotatable about a predetermined axis, an annular member (e.g., a flange forming part of a pulley or sheave) coaxially and rotatably surrounding the shaft and being movable relative to the shaft in the direction of the predetermined axis, and means for transmitting torque between the shaft and the annular member. The torque transmitting means includes first and second frames, a plurality of means for non-rotatably securing the first frame to the shaft, a plurality of means for non-rotatably mounting the second frame on the annular member, and a plurality of means for non-rotatably coupling one of the frames to the other frame. At least one of the frames is deformable in the direction of the predetermined axis.

The coupling means can include fasteners which are equidistant from each other, as seen in the circumferential direction of the annular member, and which are or which can be equidistant from the predetermined axis. Analogously, the mounting means can include fasteners which are equidistant from each other, as seen in the circumferential direction of the annular member, and which are or which can be equidistant from the predetermined axis. Still further, the securing means can include fasteners which are equidistant from each other, as seen in the circumferential direction of the annular member, and which are or which can be equidistant from the predetermined axis.

At least one of the frames can include or can consist of resilient metallic sheet material, such as sheet steel.

Each securing means can be mounted in such a way that it is coaxial with one of the mounting means.

The frames can have identical outlines, e.g., square or other polygonal outlines.

Each frame can include a plurality of identical or different braces each of which extends between one of the coupling means on the one hand, and one of the mounting and securing means on the other hand.

A further feature of the invention resides in the provision of a method of transmitting torque between coaxial first and second rotary members at least one of which is movable in the direction of common axis of such members. The method comprises the steps of securing circumferentially spaced-apart sections of a resilient first frame to the first member so that the thus secured frame spacedly surrounds the common axis of the two members, mounting circumferentially spaced-apart sections of a preferably resilient second frame on the second member adjacent the first frame, and coupling, the two frames to each other at locations which are spaced apart from each other and from those sections of the first and second frames which are secured to and mounted on the respective members. The aforementioned locations are or can be disposed at identical radial distances from the common axis of the two members, and such locations preferably have at least some freedom,of movement radially of the common axis.

The novel features which are considered as characteristic of the invention are set forth in particular in the appended claims. The improved torque transmitting apparatus itself, however, both as to its construction and the modes of assembling and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figures 1, 2:
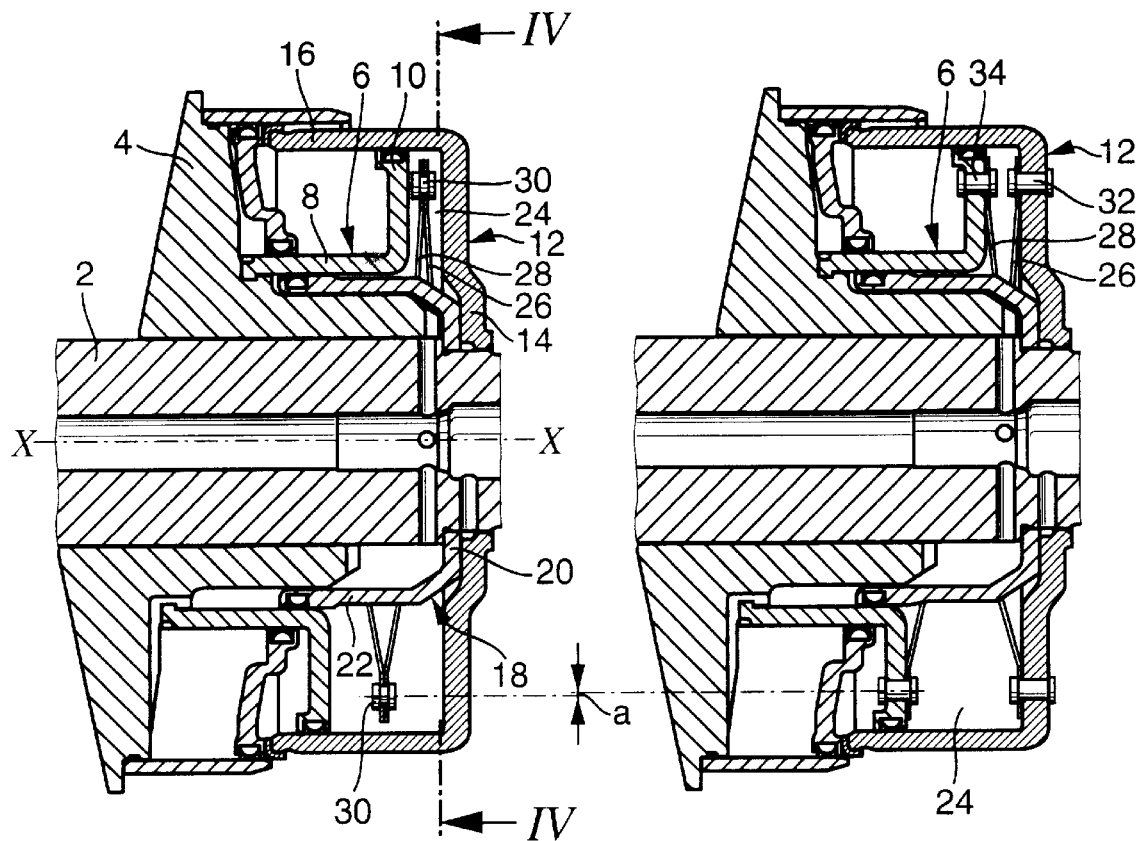
FIG. 1 is a fragmentary axial sectional view as seen in the direction of arrows from the line I—I in FIG. 4 and illustrates that portion of a continuously variable transmission which comprises a torque transmitting mechanism or system embodying one form of the present invention, the upper half of FIG. 1 showing an axially movable part of the transmission in one end position and the lower half of this Figure showing the axially movable part in the other end position substantially as seen in the direction of the common axis of the parts which transmit torque to each other by way of the improved mechanism.
FIG. 2 is a fragmentary axial sectional view of the structure shown in FIG. 1 but taken in another plane substantially as seen in the direction of arrows from the line II—II in FIG. 4, the upper half of FIG. 2 again showing the axially movable part in one end position and the lower half showing such part in the other end position.

Referring to FIGS. 1 to 5, there is shown a portion of a continuously variable transmission (CVT) which includes a first member or part composed of a shaft 2 and a substantially cup-shaped supporting ring 12 rigidly affixed to the shaft, and a second member or part composed of a conical flange 4 and an annular element 6 rigidly affixed to the flange 4. For example, the shaft 2 can replace the shaft A or B, and the flange 4 can replace the flange 1a or 2a in the structure shown in FIG. 1 of the aforementioned U.S. Pat. No. 5,611,730 to Friedmann et al. The flange 4 is movable axially of the shaft 2 toward and away from the other flange of the pulley (such other flange is located to the left of the flange 4 shown in FIGS. 1 to 3) but should not turn about the common axis X—X of the parts 2, 12 and 4, 6. The radial play of the flange 4 relative to the shaft 2 is or should preferably be close to zero, i.e., the flange 4 is a sliding fit on the shaft 1.

The annular element 6 includes a cylindrical portion 8 which is rigidly affixed to the flange 4, and a second portion 10 which extends fro the cylindrical portion 8 radially outwardly at a locus remote from the flange. The cylindrical portion 8 is coaxial with the shaft 2.

The supporting ring 12 of the member or part which further includes the shaft 2 comprises a radially or substantially radially extending portion or wall 14 and a cylindrical portion 16 which is or can be of one piece with the wall 14 and extends toward the flange 4. An annular insert 18 is confined between the shaft 2 and the supporting ring 12; this insert comprises a radially extending portion 20 and a cylindrical portion 22 which is of one piece with the radially outermost part of the portion 20 and is coaxial with and surrounded by the cylindrical portion 8 of the annular element 6.

Figure 3:
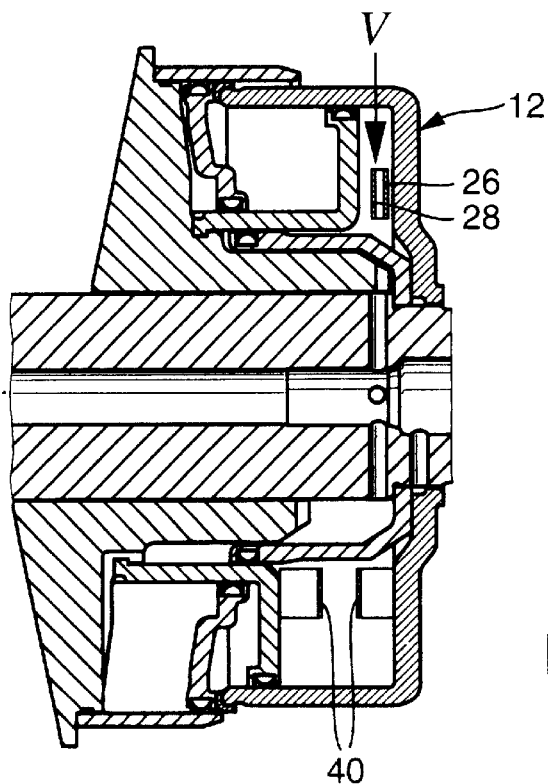
FIG. 3 is an axial sectional view of the structure shown in FIGS. 1 and 2 but taken in a third plane substantially as seen in the direction of arrows from the line III—III in FIG. 4, the upper half of FIG. 3 showing the axially movable part in one end position and the lower half showing the axially movable part in the other end position.

The annular element 6, the insert 18 and the supporting ring 12 define an annular plenum chamber 24 which can receive a pressurized hydraulic or pneumatic fluid to move the flange 4 axially of the shaft 2 in a manner not forming part of the present invention. Reference may be had again to the aforementioned U.S. Pat. No. 5,711,730 to Friedmann et al. The upper part of each of FIGS. 1 to 3 shows the flange 4 in or close to a right-hand end position, and the lower part of each of these Figures shows the flange in or close to a left-hand end position relative to the shaft 2 and relative to the non-illustrated axially fixed conical flange of the pulley including the flange 4. The construction and mode of operation of all parts of the CVT including the structure shown in FIGS. 1 to 5 form no part of the present invention.

The invention resides in the provision of a novel method of and of a novel mechanism or unit for the transmission of torque between the part including the shaft 2 and the supporting ring 12, and the part including the flange 4 and the annular element 6. The torque transmitting mechanism includes two novel components 26, 28 (hereinafter called frames for short) which spacedly surround the axis X—X when the CVT is fully assembled and at least one of which consists or can consist of deformable metallic sheet material, preferably a resilient material such as sheet steel. The illustrated frames 26, 28 are assumed to be stampings consisting of sheet steel, and each thereof has a polygonal (e.g., rectangular or square, see FIG. 4) outline. The frames 26, 28 are located next to each other in the plenum chamber 24.

FIG. 2 shows two rivets 30 which serve as a means for non-rotatably coupling spaced-apart sections 36 of the frames 26, 28 to each other. These rivets are disposed diametrically opposite each other with reference to a horizontal plane which is normal to the plane of FIG. 1 and includes the axis X—X. The coupling means or rivets 30 migrate toward and away from the radial wall 14 of the supporting ring 12 in response to axial movements of the flange 4 relative to the shaft 2. It will be noted that those torque-transmitting portions 40 (hereinafter called braces) of the frames 26, 28 which extend from the rivets 30 are or can be nearly parallel to each other in the right-hand end position of the flange 4 (as shown in the upper half of FIG. 1) but make a relatively large acute angle when the flange is in the left-hand end position shown in the lower half of FIG. 1.

Figure 4:
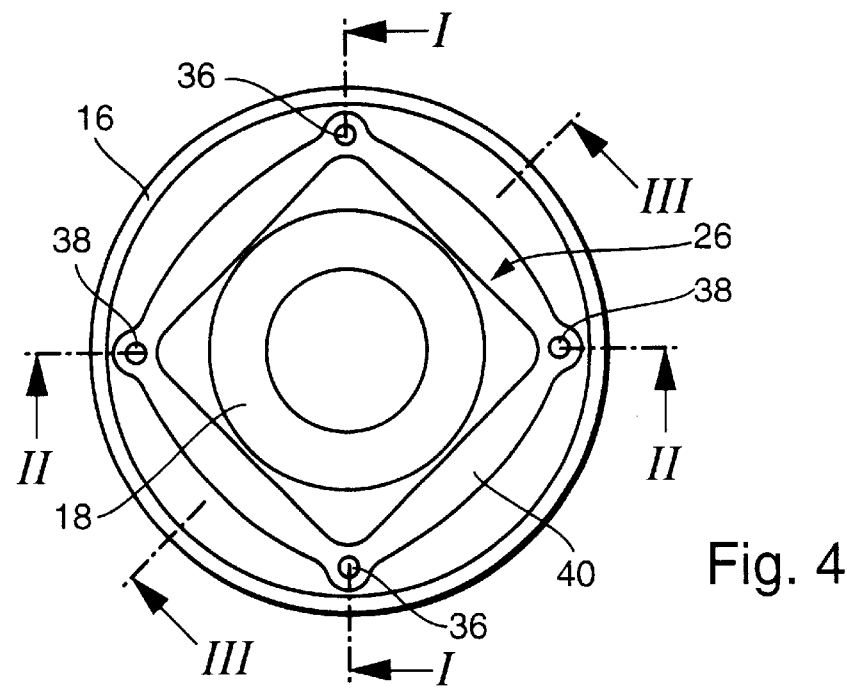
FIG. 4 is an end elevational view of the torque transmitting mechanism substantially as seen in the direction of arrows from the line IV—IV shown in FIG. 1.

FIG. 1 is an axial sectional view in a vertical plane as seen in FIG. 4, and FIG. 2 is an axial sectional view in a horizontal plane as seen in FIG. 4. FIG. 1 shows that the means for non-rotatably securing the frame 26 to the spaced-apart sections 38 of the supporting ring 12 (i.e., to the shaft 2) includes rivets 32, and that the means for non-rotatably mounting the frame 28 on spaced-apart sections 38 of the annular element 6 (i.e., of the flange 4) includes rivets 34. In the embodiment of FIGS. 1 to 4, each rivet 32 is coaxial with a rivet 34, and the common axes of such pairs of aligned rivets are parallel to the axis X—X.

FIG. 3 is an axial sectional view in a plane indicated in FIG. 4 by the line III—III, i.e., in a plane extending at an angle of 45° to the plane of each of the sections shown in FIGS. 1 and 2. Thus, the section of FIG. 3 is taken across the braces 40 of the frames 26 and 28. FIG. 4 shows only the frame 26 because the two frames 26, 28 of the torque transmitting mechanism shown in FIGS. 1 to 5 are identical and overlie each other, i.e., the frame 28 is located behind the frame 26 which is shown in FIG. 4.

Figure 5:
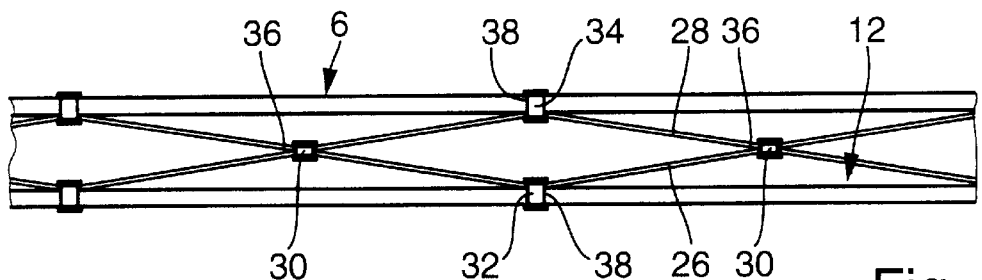
FIG. 5 is an enlarged fragmentary developed view of the torque transmitting mechanism substantially as seen in the direction of arrow V shown in FIG. 3.

The reference characters 36 denote in FIGS. 4 and 5 those sections of the frames 26 and 28 which are non-rotatably coupled to each other by the rivets 30. Certain reference characters 38 denote those sections of the frame 26 which are secured to the ring 12 by the rivets 32, and certain reference characters 38 denote those sectons of the frame 28 which are mounted on the annular element 6 by the rivets 34.

Each of the frames 26, 28 has four torque transmitting braces 40. The neighboring braces 40 of each of these frames make with each other a right angle. FIG. 4 shows that the width of each brace decreases from its median portion toward the respective rivets 30, 32 and 30, 34, i.e., the median portion of each brace 40 exhibits a certain resistance to deforming stresses but the resistance of each end portion is less pronounced. Such design ensures that each brace 40 can stand pronounced tensional (lengthening) stresses but can more readily yield to certain other stresses (such as in the axial or radial direction of the shaft 2). In other words, the braces 40 are more resilient in the radial and axial directions of the shaft 2 but exhibit a pronounced or greater resistance to tensional stresses.

The manner in which the rivets 30 alternate with the rivets 32 and 34, as seen in the circumferential directions of the respective frames 26, 28, is shown in the developed view of FIG. 5. It will be seen that each rivet 30 forms the pivot member of a shear type joint between the neighboring sections of the frames 26 and 28. The rivets 30 cooperate with the rivets 32, 34 to ensure that the frames 26, 28 cannot turn relative to the respective parts 2, 12 and 4, 6 but that the rivets 30 can move axially of the torque transmitting mechanism, i.e., the resilient frames can bias the flange 4 to the one or to the other end position as seen in the direction of the axis X—X.

When the annular element 6 is in the process of transmitting torque to the supporting ring 12 (i.e., when the flange 4 transmits torque to the shaft 2) or vice versa, one brace 40 at a section 36 is subjected to a tensional stress and the other brace at such section is subjected to a compressive stress. In their entirety, such tensional and compressive stresses ensure that the annular element 6 and the supporting ring 12 (i.e., the flange 4 and the shaft 2) cannot turn relative to each other. This holds true for each axial position of the flange 4 relative to the shaft 2, i.e., for each of the two end positions of the flange 4 shown in FIG. 2 as well as for each intermediate axial position of the flange.

During axial movement of the flange 4 relative to the shaft 2, i.e., during axial movement of the annular element 6 relative to the supporting ring 12, the coupling means (rivets) 30 between the frames 26, 28 must move radially of the axis X—X if the lengths of the braces 40 are to remain unchanged. Such radial movements of the rivets 30 are facilitated due to the aforedescribed configurations of the braces 40, i.e., that the weakest portions of each brace are its end portions which are first to yield to bending stresses, namely at the sections 36 and 38.

The illustrated frames 26, 28 are actually special versions of leaf springs which cooperate with each other at the coupling rivets 30 and with the parts 6, 12 at the rivets 34, 32 to ensure that the parts 2, 4 cannot rotate relative to each other but that at least one of these parts can move relative to the other part in the direction of the axis X—X.

The sections 36 and 38 are or can be equidistant from the axis X—X. When the flange 4 has completed a full axial movement relative to the shaft 2 (such as from the axial position shown in the upper half to the axial position shown in the lower half of FIG. 1), the rivets 30 (i.e., the locations 36) migrate slightly radially toward the axis X—X through a small or very small distance a (shown between the lower halves of FIGS. 1 and 2) which can be less than 1 mm. The character a actually denotes the difference between the distance of a rivet 32 or 34 from the axis X—X on the one hand, and the distance of a rivet 30 from the axis X—X on the other hand, when the flange 4 assumes one of the end positions as seen in the direction radially of the axis X—X.

That axial position of the flange 4 relative to the shaft 2 at which the rivets 30, 32, 34 are located at the same radial distance from the axis X—X can be seleced as a function of one or more variables or requirements, and this also applies for the rigidity (resistance to deformation) of the resilient frames 26 and 28. For example, the forces which develop as a result of deformation of the resilient frames 26, 28 in response to axial movement of the flange 4 from a neutral position relative to the shaft 2 and/or vice versa can be utilized to influence (a) the force with which the flange 4 and the other flange of a pulley on the shaft 2 bear upon the marginal portions of the chain which transmits torque between the just mentioned pulley and the other pulley of the CVT, and/or (b) the selection of the ratio of such CVT.

The improved torque transmitting mechanism is susceptible of numerous additional modifications. For example, the square frames (such as 26, 28) can be replaced with octagonal frames so that the number of sections where the braces of such frames are coupled to each other, secured to the supporting ring 12 and mounted on the annular element 6 can be increased accordingly. The exact extent of elasticity of the frame 26 and/or 28 can be determined in advance by appropriate selection of the thicknesses, shapes, profiles, materials and/or other parameters which influence the elasticity. Furthermore, the frame 26 may but need not always be identical with the frame 28; this holds true for the configurations, thicknesses, profiling, materials and/or other characteristics which influence the extent of deformability, the number of rivets, threaded connectors, resilient snaptype connectors and/or other fasteners which are selected to couple the two frames to each other, to secure the frame 26 or its equivalent to the supporting ring 12, and/or to mount the frame 28 or its equivalent on the annular element 6. The element 6 can be of one piece with the flange 4 and/or the ring 12 can be of one piece with the shaft 2.

At least one of the frames 26, 28 can constitute a laminate consisting of two or more thinner frames which overlie and adhere to each other, which may but need not exhibit identical thicknesses, resiliencies and/or other characteristics necessary to ensure that the braces of the respective laminate exhibit a desired or requisite resistance to tensional, compressive, bending, twisting and/or other stresses.

It is clear that the improved torque transmitting mechanism or system can be put to use in a CVT as well as in or in connection with many other apparatus wherein coaxial parts should share all rotary movements but at least one of the parts should be free to move axially relative to the other part or parts.

Figure 6:
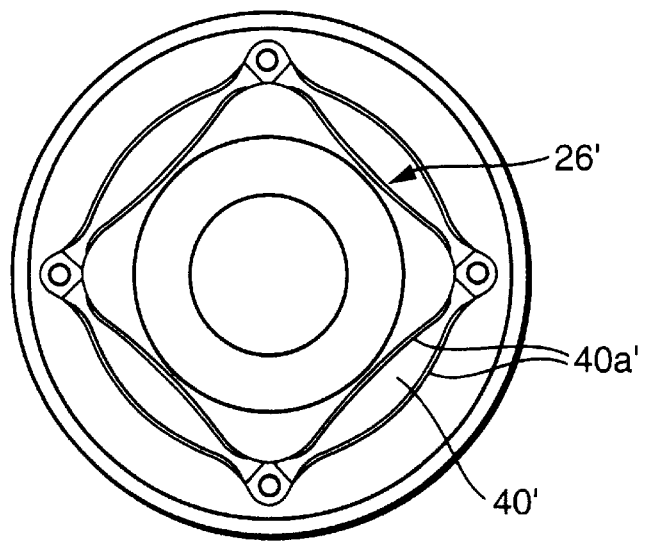
FIG. 6 is a view similar to that of FIG. 4 but showing the constituents of a modified torque transmitting mechanism.

FIG. 6 illustrates the structure of FIG. 4 but with modified frames (only the frame 26' can be seen in FIG. 6) having profiled braces 40'. The difference between a brace 40 and a brace 40' is that the latter has a substantially U-shaped or an analogous cross-sectional outline (with marginal portions or sidewalls 40a' extending from a bottom wall toward the observer of FIG. 6). This enhances the rigidity of the braces 40' as seen in their longitudinal directions, i.e., the ability of such profiled braces to withstand compressive stresses. Other suitable configurations which enhance the ability of profiled and/or otherwise shaped braces to withstand compressive stresses are also within the purview of the instant invention.

Figure 7:
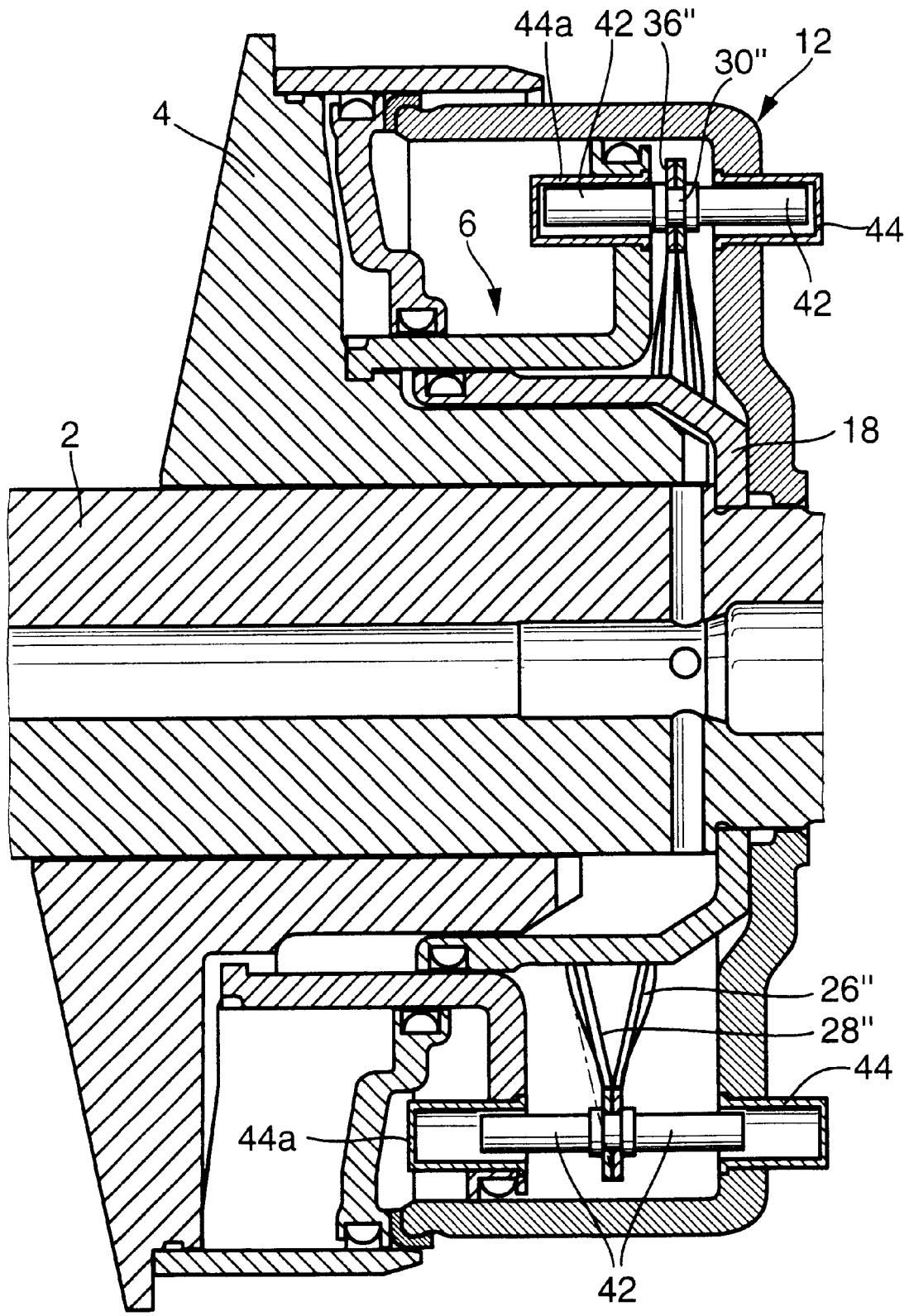
FIG. 7 is a fragmentary axial sectional view of a continuously variable transmission wherein a shaft can transmit torque to a coaxial axially movable flange and/or vice versa by way of a third mechanism, the upper half of FIG. 7 showing the flange in one end position and the lower half showing the flange in the other end position.

FIG. 7 shows a modified torque transmitting mechanism which connects a rotary shaft 2 with a coaxial flange 4 in such a way that these parts are compelled to rotate with each other but that the shaft can move axially relative to the flange and/or vice versa. In addition to the features already described in connection with the torque transmitting mechanism shown in FIGS. 1 to 5, the embodiment of FIG. 7 is provided with means for preventing any, or any appreciable, stray movements of the coupling means 30", i.e., of those sections (36") of the frames 26", 28" which are coupled to each other.

Each coupling element 30" includes two coaxial extensions in the form of elongated cylindrical or otherwise configurated pins or studs 42 which are received in sockets 44, 44a respectively provided on or in the supporting ring 12' and on or in the annular element 6". The configurations of the extensions 42 and/or sockets 44, 44a are such that the sections 36" have a certain freedom of movement radially of the common axis of the shaft 2 and flange 4 but are held against movement circumferentially of the shaft 2 and flange 4.

It has been found that the just described features reliably prevent undesirable tilting and/or twisting of those sections of the frames 26", 28" which are coupled to each other by the rivets 30", i.e., by coupling means the movements of which are limited by the respective sockets 44, 44a in the afore-described manner.

A comparison of the positions of the lower extensions 42 and of the positions of the upper extensions 42 shown in FIG. 7 indicates that the extensions move radially of and toward the common axis of the shaft 2 and flange 4 in response to axial movement of the flange 4 from its right-hand to its left-hand end position.

The sockets 44, 44a can constitute separately fabricated parts which are welded and/or otherwise secured to the ring 12" and element 6". However, it is equally possible to omit such separately produced sockets and to provide the ring 12" and the element 6" with portions which perform the functions of the illustrated sockets; for example, such portions of the parts 12", 6" can be provided with radially extending slots for the respective extensions 42. It is also possible to provide extensions on the parts 6", 12" and to provide sockets for such extensions in or on the frames 26", 28".

As already mentioned hereinbefore, one or both frames of the improved torque transmitting mechanism can be utilized to bias the shaft 2 and/or the flange 4 to a predetermined position, e.g., to bias the flange 4 to one of its end positions. However, it is also possible to provide discrete biasing means (e.g., coil springs or the like) which are installed to bias the flange 4 and/or the shaft 2 in conjunction with or independently of the frames.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torque transmitting systems and, therefore, such adaptations should and are intended to be comprehended within the meaning and range of equivalence of the appended claims.

What is claimed is:

1. A mechanism for transmitting torque between first and second members which are rotatable about a common axis and at least one of which is movable relative to the other in the direction of the common axis, comprising:

first and second frames arranged to spacedly surround the common axis, at least one of said frames being deformable;

a plurality of means for securing at least two spaced-apart sections of the first frame for rotation with the first member;

a plurality of means for mounting at least two spaced-apart sections of said second frame for rotation with the second member; and a plurality of means for non-rotatably coupling said frames to each other at a plurality of locations each disposed between one section of said first frame and one section of said second frame;

wherein the first and second members are axially movable relative to each other by means of a pressure built up in a pressure chamber;

wherein the first and second frames are arranged in the pressure chamber.

2. The mechanism of claim 1, wherein said securing means alternate with said coupling means as seen circumferentially of the common axis when said frames surround the common axis.

3. The mechanism of claim 2, wherein each of said locations alternates with one of said securing means and one of said mounting means as seen in a circumferential direction of the common axis.

4. The mechanism of claim 3, wherein one of the members includes a shaft and the other of the members is part of a pulley in a continuously variable transmission.

5. The mechanism of claim 1, wherein each of said securing means is aligned with one of said mounting means.

6. The mechanism of claim 5, wherein said securing means are equidistant from each other as seen circumferentially of the common axis when said frames surround the common axis.

7. The mechanism of claim 5, wherein each of said coupling means is equidistant from two of said securing means.

8. The mechanism of claim 1, wherein each of said securing means is spaced apart from the common axis a first distance and each of said mounting means is spaced apart from the common axis a second distance which at least approximates said first distance when said frames surround said axis.

9. The mechanism of claim 1, wherein each of said frames includes a plurality of braces each extending between one of said securing and mounting means on the one hand and one of said coupling means on the other hand, each of said braces exhibiting a pronounced resistance to tensional stresses and a lesser resistance to bending stresses.

10. The mechanism of claim 9, wherein said bending stresses include torsional stresses.

11. The mechanism of claim 1, wherein said first and second frames respectively comprise pluralities of first and second braces, each of said first braces extending between one of said securing means and one of said coupling means and each of said second braces extending between one of said mounting means and one of said coupling means.

12. The mechanism of claim 1, wherein at least one of said frames contains sheet metal.

13. The mechanism of claim 12, wherein said at least one frame is resilient.

14. The mechanism of claim 12, wherein said at least one frame includes elongated braces having profiles arranged to promote resistance to compressive stresses.

15. The mechanism of claim 12, wherein said at least one frame is resilient and includes weakened portions in the regions of at least some of said securing and mounting means.

16. The mechanism of claim 1, wherein said coupling means are movable radially of the common axis when said frames surround the common axis and when the at least one member moves axially relative to the other member.

17. The mechanism of claim 16, wherein said coupling means are fixed in a circumferential direction of the first and second members when said frames surround the common axis.

18. The mechanism of claim 1, wherein at least one of said securing, mounting and coupling means includes a connection constituting at least one of riveted, threaded and snap-on connections.

19. A torque transmitting apparatus, comprising:
a shaft rotatable about a predetermined axis;
an annular member coaxially and rotatably surrounding said shaft and movable relative to said shaft In the direction of said axis; and
means for transmitting torque between said shaft and said annular member, including
first and second frames,
a plurality of means for non-rotatably securing said first frame to said shaft,
a plurality of means for non-rotatably mounting said second frame on said annular member, at least one of said frames being deformable in the direction of said axis, and
a plurality of means for non-rotatably coupling one of said frames to the other of said frames,
wherein the shaft and the annular member are axially movable relative to each other by means of a pressure built up in a pressure chamber;
wherein the first and second frames are arranged in the pressure chamber.

20. The apparatus of claim 19, wherein said annular member includes a conical flange of a pulley.

21. The apparatus of claim 19, wherein said coupling means include fasteners which are equidistant from each other, as seen in the circumferential direction of said annular member, and which are equidistant from said axis.

22. The apparatus of claim 19, wherein said mounting means include fasteners which are equidistant from each other, as seen in the circumferential direction of said annular member, and which are equidistant from said axis.

23. The apparatus of claim 19, wherein said securing means include fasteners which are at least substantially equidistant from each other, as seen in the circumferential direction of said annular member, and which are at least substantially equidistant from s aid axis.

24. The apparatus of claim 19, wherein at least one of said frames consists of resilient metallic sheet material.

25. The apparatus of claim 19, wherein each of said securing means is coaxial with one of said mounting means.

26. The apparatus of claim 19, wherein each of said frames has a polygonal outline.

27. The apparatus of claim 26, wherein each of said frames includes a plurality of braces each extending between one of said coupling means on the one hand and one of said securing and mounting means on the other hand.

28. A method of transmitting torque between coaxial first and second rotary members which are movable relative to each other in the direction of the common axis of said members by means of a pressure built up in a pressure chamber, comprising the steps of:
securing circumferentially spaced apart sections of a resilient first frame inside the pressure chamber to the first member so that the thus secured first frame spacedly surrounds the common axis;
mounting circumferentially spaced apart sections of a second frame inside the pressure chamber on the second member adjacent the first frame; and
coupling the frames to each other at locations spaced apart from each other and from those sections of the first and second frames which are secured to and mounted on the respective members.

* * * * *